United States Patent
Iwasaki et al.

(10) Patent No.: US 10,843,610 B2
(45) Date of Patent: Nov. 24, 2020

(54) VEHICLE SEAT

(71) Applicants: TOYOTA JIDOSHA KABUSHIKI KAISHA, Toyota (JP); TOYOTA BOSHOKU KABUSHIKI KAISHA, Kariya (JP)

(72) Inventors: Keita Iwasaki, Toyota (JP); Keisuke Toda, Kariya (JP)

(73) Assignees: TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 78 days.

(21) Appl. No.: 15/800,519

(22) Filed: Nov. 1, 2017

(65) Prior Publication Data

US 2018/0134189 A1    May 17, 2018

(30) Foreign Application Priority Data

Nov. 14, 2016    (JP) ................... 2016-221926

(51) Int. Cl.
*B60N 2/90* (2018.01)
*B60N 2/806* (2018.01)
*B60N 2/885* (2018.01)
*B60N 2/80* (2018.01)

(52) U.S. Cl.
CPC ............ *B60N 2/914* (2018.02); *B60N 2/806* (2018.02); *B60N 2/885* (2018.02); *B60N 2002/899* (2018.02)

(58) Field of Classification Search
CPC .......... B60N 2/665; B60N 2/803; B60N 2/865
See application file for complete search history.

(56) References Cited

U.S. PATENT DOCUMENTS

| | | | | |
|---|---|---|---|---|
| 3,795,021 A | * | 3/1974 | Moniot | A47C 7/38 297/284.1 |
| 4,580,837 A | * | 4/1986 | Bayley | B60N 2/665 297/362.12 |
| 5,222,784 A | * | 6/1993 | Hamelin | B60N 2/853 297/408 |

(Continued)

FOREIGN PATENT DOCUMENTS

| | | |
|---|---|---|
| DE | 102008037232 A1 | 2/2010 |
| DE | 102015117982 A1 | 5/2016 |

(Continued)

OTHER PUBLICATIONS

Translation of Jan. 8, 2019 Office Action issued in Japanese Patent Application No. 2016-221926.

*Primary Examiner* — David R Dunn
*Assistant Examiner* — Christopher E Veraa
(74) *Attorney, Agent, or Firm* — Oliff PLC

(57) ABSTRACT

A vehicle seat includes a headrest body provided at an upper portion of a seat back rotatably supported by a seat cushion on which an occupant is seated. The headrest body is covered with a skin material. The headrest body includes a driving body that is configured to form a swelling portion that is a portion of the skin material in a seat-height direction swelling toward a front side of the seat at a surface of a seat front side of the skin material and change a formation position of the swelling portion in the seat-height direction by being operated inside the headrest body.

7 Claims, 8 Drawing Sheets

(56) References Cited

U.S. PATENT DOCUMENTS

| | | | | |
|---|---|---|---|---|
| 5,567,015 A * | 10/1996 | Arias | ............... | A47C 7/383 |
| | | | | 297/397 |
| 5,829,838 A * | 11/1998 | Offenbacher | ........ | B60N 2/6009 |
| | | | | 297/408 |
| 6,158,812 A * | 12/2000 | Bonke | ............... | B60R 16/08 |
| | | | | 297/391 |
| 6,203,105 B1 * | 3/2001 | Rhodes, Jr. | ............ | A47C 4/54 |
| | | | | 297/284.6 |
| 2003/0230917 A1 * | 12/2003 | Dorfler | ............ | B60N 2/914 |
| | | | | 297/284.1 |
| 2006/0226689 A1 * | 10/2006 | Linnenbrink | ......... | B60N 2/829 |
| | | | | 297/408 |
| 2010/0156163 A1 * | 6/2010 | Daisuke | ............ | B60N 2/686 |
| | | | | 297/452.2 |
| 2012/0292973 A1 * | 11/2012 | Westerink | ........... | B60N 2/80 |
| | | | | 297/391 |
| 2014/0032043 A1 * | 1/2014 | Line | ............... | B60N 2/976 |
| | | | | 701/36 |
| 2014/0375100 A1 * | 12/2014 | Reese | ............... | B60N 2/914 |
| | | | | 297/391 |
| 2016/0129815 A1 * | 5/2016 | Kolich | ............... | B60N 2/4864 |
| | | | | 297/391 |
| 2017/0113583 A1 * | 4/2017 | Kondrad | ............ | B60N 2/865 |
| 2017/0197530 A1 * | 7/2017 | Line | ............... | B60N 2/885 |
| 2017/0349061 A1 * | 12/2017 | Benson | ............ | B60N 2/0244 |

FOREIGN PATENT DOCUMENTS

| | | |
|---|---|---|
| JP | S50-043440 U | 5/1975 |
| JP | H02-112142 U | 9/1990 |
| JP | H05-028246 U | 4/1993 |
| JP | H06-253948 A | 9/1994 |
| JP | H06-077592 U | 11/1994 |
| JP | H11-278132 A | 10/1999 |
| JP | 2006-224921 A | 8/2006 |
| JP | 2008-194298 A | 8/2008 |
| JP | 2013-189029 A | 9/2013 |
| JP | 2016-172487 A | 9/2016 |

* cited by examiner

VEHICLE SEAT

INCORPORATION BY REFERENCE

The disclosure of Japanese Patent Application No. 2016-221926 filed on Nov. 14, 2016 including the specification, drawings and abstract is incorporated herein by reference in its entirety.

BACKGROUND

1. Technical Field

The disclosure relates to a vehicle seat.

2. Description of Related Art

Japanese Unexamined Patent Application Publication No. 2013-189029 (JP 2013-189029 A) discloses a neck support device. In the neck support device, a neck support that supports the neck of an occupant is provided between a seat back and a headrest of a vehicle seat. The neck support is movable substantially in a seat up-down direction and is fixed by fastening a fastening bolt. Accordingly, the neck support can be disposed according to the position of the neck of the occupant, and thus the neck can be appropriately supported.

SUMMARY

However, in the configuration disclosed in JP 2013-189029 A, when the height of the neck support is adjusted, the fastening bolt needs to be loosened and then fastened after the neck support is moved, which results in an increase in time and effort to adjust the position of the neck support. Therefore, the related art has room for improvement in the aspect described above.

The disclosure provides a vehicle seat capable of easily adjusting the position of a portion that supports the neck of an occupant.

An aspect of the disclosure relates to a vehicle seat including a headrest body provided at an upper portion of a seat back rotatably supported by a seat cushion on which an occupant is seated. The headrest body is covered with a skin material. The headrest body includes a driving body that is configured to form a swelling portion that is a portion of the skin material in a seat-height direction swelling toward a front side of the seat at a surface of a seat front side of the skin material and change a formation position of the swelling portion in the seat-height direction by being operated inside the headrest body.

According to the aspect of the disclosure, the headrest body covered with the skin material is provided at the upper portion of the seat back rotatably supported by the seat cushion. In the headrest body, by operating the driving body provided inside the headrest body, the swelling portion that is the portion of the skin material in the seat-height direction swelling toward the front side of the seat is formed at the seat front side surface of the skin material. Therefore, the neck of the occupant positioned forward of the headrest body in a seat front-rear direction can be supported by the swelling portion. In addition, since the swelling portion is configured such that the formation position of the swelling portion is changed in the seat-height direction by the driving body, the swelling portion can be easily moved according to the position of the neck varying with the occupant.

In the vehicle seat according to the aspect, the driving body may include a plurality of airbags, the airbags being arranged in a seat up-down direction and configured to be inflated by air being supplied into the airbags.

According to the aspect of the disclosure, since the driving body includes the airbags configured to be inflated by air being supplied into the airbags, the swelling portion can be formed by supplying air into the airbags. In addition, by arranging the airbags in the seat up-down direction and adjusting the amount of air supplied to each of the airbags, the formation position of the swelling portion can be changed in the seat-height direction. That is, in general, in a case of a configuration in which the swelling portion is formed of an actuator, a motor, or the like, another actuator, motor, or the like is needed to change the formation position of the swelling portion in the seat-height direction. However, in the embodiment of the disclosure, by adjusting the amount of air supplied to each of the airbags using a single air supply source, the formation position of the swelling portion can be changed in the seat-height direction. Accordingly, the swelling portion can be allowed to swell and move with a relatively small number of components.

In the vehicle seat according to the aspect, a lower end portion of one airbag included in the plurality of airbags and disposed at a higher position in the seat up-down direction and an upper end portion of another airbag included in the plurality of airbags and disposed adjacent to the one airbag and below the one airbag in the seat up-down direction may be overlapped with each other in a seat front-rear direction.

In the vehicle seat according to the aspect, at least two of the plurality of airbags may be respectively disposed at both sides of the headrest body in a seat-width direction.

According to the aspect of the disclosure, since the airbags are respectively disposed at both sides of the headrest body in the seat-width direction, when air is supplied, the divided airbags swell toward the front side of the seat on the right and left sides of the head of the occupant. Therefore, the head of the occupant can be supported from the right and left sides.

In the vehicle seat according to the aspect, the airbag disposed at a lower position in the seat up-down direction may be set to have greater dimensions in the seat-width direction in an inflated state than the airbag disposed at a higher position in the seat up-down direction.

According to the aspect of the disclosure, among the airbags arranged along the seat up-down direction of the driving body, the airbag disposed at a lower position in the seat up-down direction is set to have greater dimensions in the seat-width direction in the inflated state than the airbag disposed at a higher position in the seat up-down direction. In general, in a case where an occupant having a relatively large physique is seated, the shoulder of the occupant is positioned near the airbag provided at the seat lower side of the headrest body. However, in the aspect of the disclosure, since the dimensions of the airbag in the seat-width direction in the inflated state corresponding to the shoulder of the occupant are set to be greater than the airbag at a higher position in the seat up-down direction, the shoulder of the occupant can be widely supported by the airbag disposed at a lower position in the seat up-down direction.

In the vehicle seat according to the aspect, the skin material of the headrest body may be configured to be continuous with the skin material that covers the seat back.

According to the aspect of the disclosure, since the skin material that covers the headrest body is configured to be continuous with the skin material that covers the seat back, when the swelling portion is formed, the part of the occupant from the neck of the occupant to the shoulder of the occupant corresponding to the seat back can be continuously supported by the skin material. That is, the part of the occupant from the neck to the shoulder can be widely covered.

In the vehicle seat according to the aspect, the driving body may include an up-down adjusting motor configured to adjust a position of the swelling portion in a seat up-down direction, and a front-rear adjusting motor configured to adjust a position of the swelling portion in a seat front-rear direction.

With the vehicle seat according to the aspect, an excellent effect of easily adjusting the position of a portion that supports the neck of the occupant is obtained.

With the vehicle seat according to the aspect, an excellent effect of achieving space saving is obtained.

With the vehicle seat according to the aspect, an excellent effect of improving a property of holding the head of the occupant is obtained.

With the vehicle seat according to the aspect, an excellent effect of improving comfort at the time of seating is obtained.

With the vehicle seat according to the aspect, an excellent effect of further improving comfort at the time of seating is obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a vehicle seat will be described with reference to FIGS. 1 to 7B. Arrows FR, RH, UP shown in the figures respectively indicate a forward direction in a vehicle front-rear direction, an outward direction in a vehicle-width direction, and an upward direction in a vehicle up-down direction. In the first embodiment, in the vehicle seat, a seat front-rear direction is coincident with the vehicle front-rear direction, a seat up-down direction is coincident with the vehicle up-down direction, and a seat-width direction is coincident with the vehicle-width direction.

Figure 1:
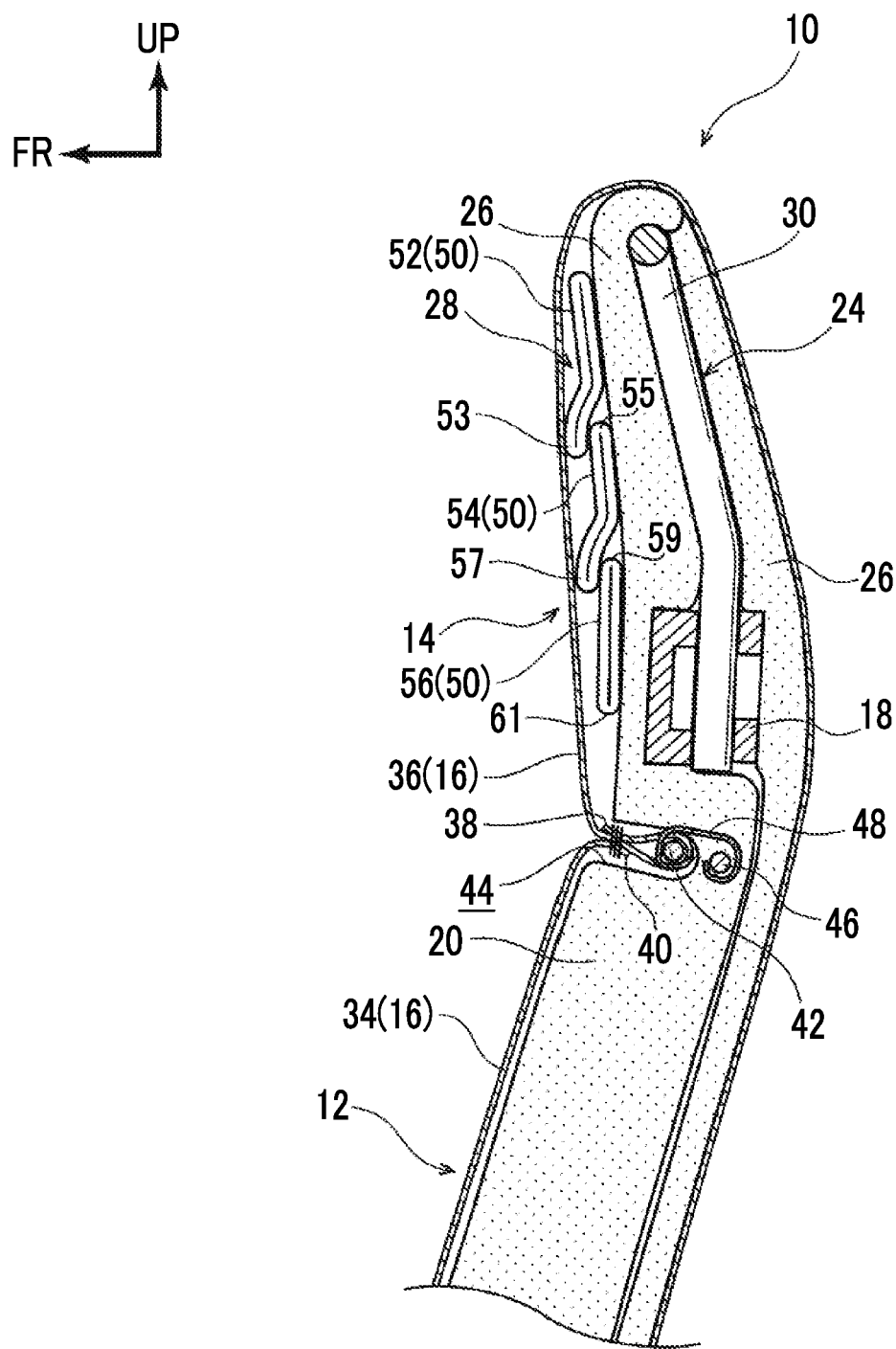
FIG. 1 is a sectional view illustrating a state in which a headrest body of a vehicle seat according to a first embodiment is viewed in a vehicle side view.

As illustrated in FIG. 1, a vehicle seat 10 provided in the vehicle cabin of a vehicle (not illustrated) is configured to include a seat cushion (not illustrated) on which an occupant is seated, a seat back 12 that is rotatably supported by the rear end portion of the seat cushion, a headrest body 14 provided integrally with the upper portion of the seat back 12, and a skin material 16. The seat back 12 is configured to include a seat back frame 18 and a seat back cushion 20 attached to the seat back frame 18 in the seat back 12.

The headrest body 14 is configured to include a headrest frame 24, a headrest cushion 26, and a driving body 28 in the headrest body 14. The headrest frame 24 is configured to include a headrest stay 30, and a headrest plate 32 (see FIG. 7A). The headrest stay 30 is formed by bending a metal pipe member or the like and is formed in a substantially U-shape that is open toward the lower side of the vehicle in a vehicle front view. The headrest plate 32 is attached to the headrest stay 30 to cover the vehicle front side of the headrest stay 30. In addition, the lower end portion of the headrest stay 30 is inserted into the upper end portion of the seat back frame 18 such that the headrest stay 30 and hence the headrest frame 24 are held by the seat back frame 18.

The headrest cushion 26 is formed of a flexible material such as urethane foam, is formed integrally with the seat back cushion 20, and is provided forward and rearward of the headrest frame 24 in the vehicle front-rear direction.

The seat back 12, the headrest body 14, and the seat cushion are covered with the skin material 16. The skin material 16 is made of cloth having elasticity. The skin material 16 of the first embodiment includes a seat back front surface covering portion 34 that covers the vehicle front side of the seat back 12, and a headrest covering portion 36 that continuously covers the vehicle rear side of the seat back 12 and the vehicle front side and the vehicle rear side of the headrest body 14, and is formed by appropriately sewing the seat back front surface covering portion 34 and the headrest covering portion 36. Specifically, an end portion 38 of the headrest covering portion 36 is folded back to the front side of the vehicle, and the end portion 38 and an end portion 40 of the vehicle upper side of the seat back front surface covering portion 34 are sewn to each other. That is, the headrest covering portion 36 is continuous with the seat back front surface covering portion 34.

A wire 42 is inserted into a folded portion of the end portion 38 of the headrest covering portion 36. The folded portion of the end portion 38 and the wire 42 are accommodated in a groove 44 that is formed in the seat back cushion 20 (the headrest cushion 26) and is open toward the front side of the vehicle. The wire 42 is connected to an insert wire 46 insert-molded in the seat back cushion 20, by a hog ring 48.

The driving body 28 is configured to include a plurality of airbags 50, and the airbags 50 are attached to the vehicle front side surface of the headrest cushion 26 disposed forward of the headrest stay 30 in the vehicle front-rear direction. The airbags 50 specifically include first airbags 52 disposed at a higher position in the vehicle up-down direction, second airbags 54 disposed at a position lower than the position of the first airbags 52 in the vehicle up-down direction, and a third airbag 56 disposed at a position lower than the position of the second airbags 54 in the vehicle up-down direction. That is, the first airbags 52, the second airbags 54, and the third airbag 56 are arranged in the seat up-down direction. A lower end portion 53 of the first airbag 52 is disposed to overlap an upper end portion 55 of the second airbag 54 in the vehicle front-rear direction. Similarly, a lower end portion 57 of the second airbag 54 is disposed to overlap an upper end portion 59 of the third airbag 56 in the vehicle front-rear direction. In addition, a lower end portion 61 of the third airbag 56 is disposed at a position corresponding to a lower end portion 60 of the headrest plate 32 (see FIG. 7A).

The first airbags 52, the second airbags 54, and the third airbag 56 are respectively connected to pumps (not illustrated) provided inside the vehicle seat 10 via pipes communicating with the insides of the first airbags 52, the second airbags 54, and the third airbag 56. The first airbags 52, the second airbags 54, and the third airbag 56 are configured to be inflated by air being supplied thereto from the pumps via the pipes. The pumps are provided with controllers (not illustrated) such that the first airbags 52, the second airbags 54, and the third airbag 56 can be individually supplied with air by the controllers.

Figure 7A:
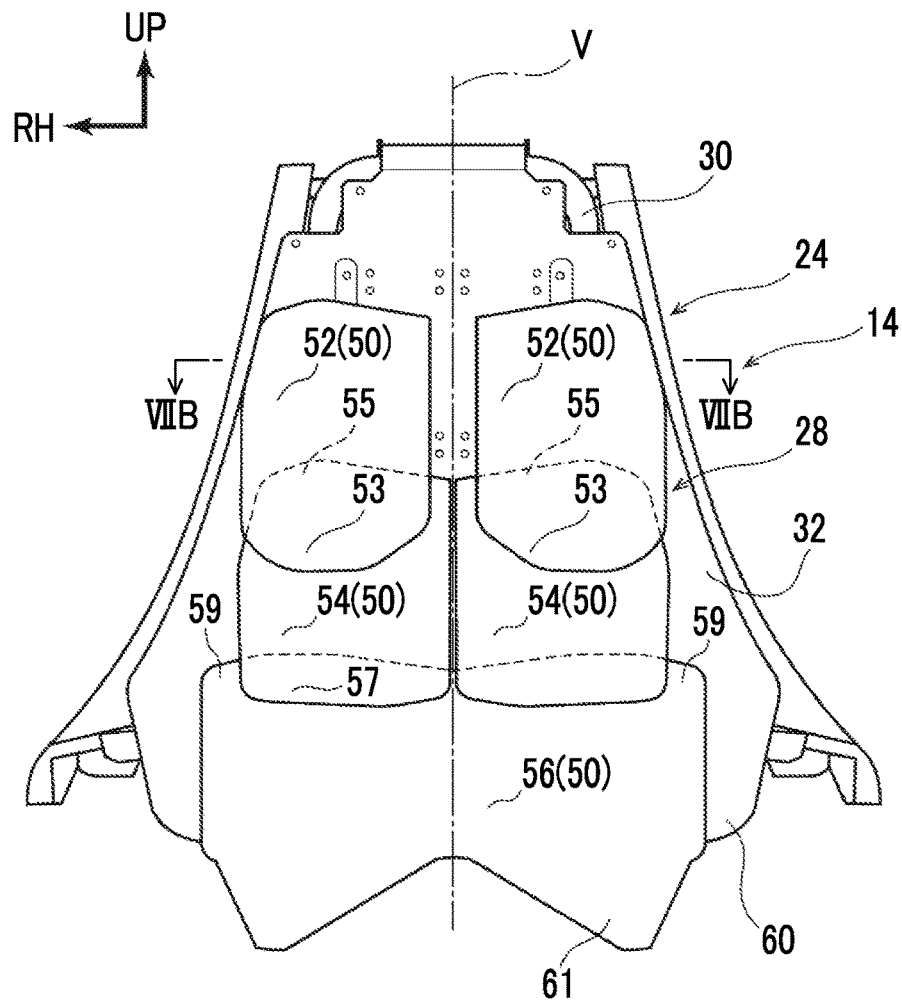
FIG. 7A is a front view illustrating a state in which the inside of the headrest body of the vehicle seat according to the first embodiment is viewed in a vehicle front view.

As illustrated in FIG. 7A, the first airbags 52 are disposed as a pair of right and left airbags between which a vertical line V passes through the middle of the headrest body 14 in the seat-width direction in the vehicle front view. The outer sides of the upper end portions of the first airbags 52 in the seat-width direction are disposed at positions corresponding to the outer end portions of the headrest plate 32 in the seat-width direction. In FIG. 7A, illustration of the headrest cushion 26 is omitted to facilitate understanding of the relationship between the headrest plate 32 and the airbags 50.

Similar to the first airbags 52, the second airbags 54 are disposed as a pair of right and left airbags with the vertical line V therebetween in the vehicle front view. The dimensions of the second airbag 54 in the seat-width direction in an inflated state are set to be substantially equal to the dimensions of the first airbag 52 in the seat-width direction in an inflated state.

The third airbag 56 is configured as a single body, and is set to have greater dimensions in the seat-width direction than the first airbag 52 and the second airbag 54 in the inflated state.

Operation of Airbags

Figure 2:
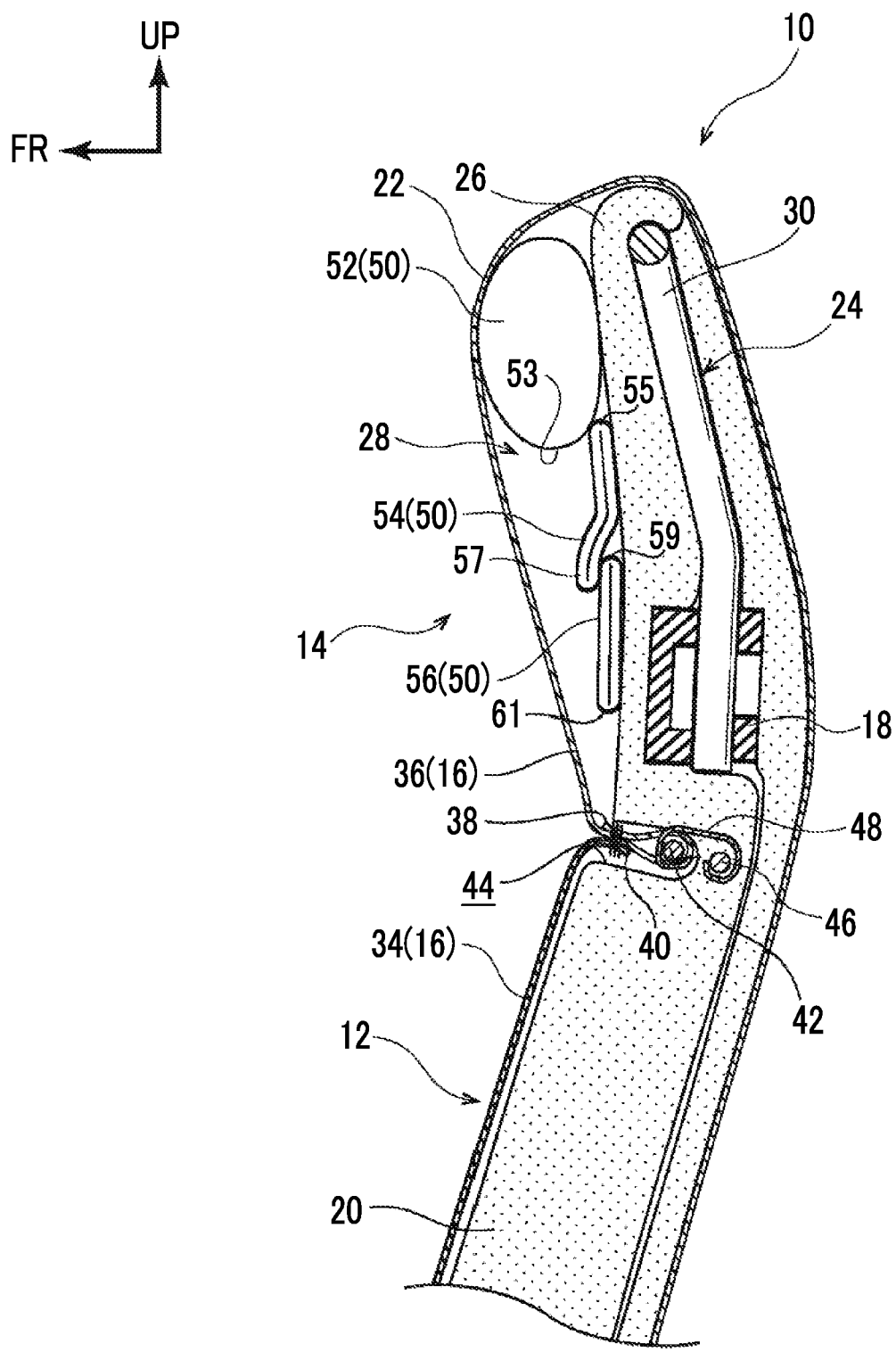
FIG. 2 is a sectional view illustrating a state in which a first airbag operated in the headrest body of the vehicle seat according to the first embodiment is viewed in the vehicle side view.

The airbags 50 operate as follows. First, in a case where an occupant A (not illustrated) having a relatively large physique is seated on the vehicle seat 10, the neck of the occupant A is positioned at the vehicle upper side of the headrest body 14. In this case, by operating the pump and the controller by operating an operation switch (not illustrated), air is supplied to the first airbag 52 as illustrated in FIG. 2 such that the first airbag 52 swells toward the front side of the vehicle. Therefore, a swelling portion 22 that is a portion of the headrest covering portion 36 (the skin material 16) in a seat-height direction swelling toward the front side of the vehicle is formed at the vehicle upper side of the headrest body 14. The neck of the occupant A can be supported by the swelling portion 22 formed at the vehicle upper side of the headrest body 14.

Figure 3:
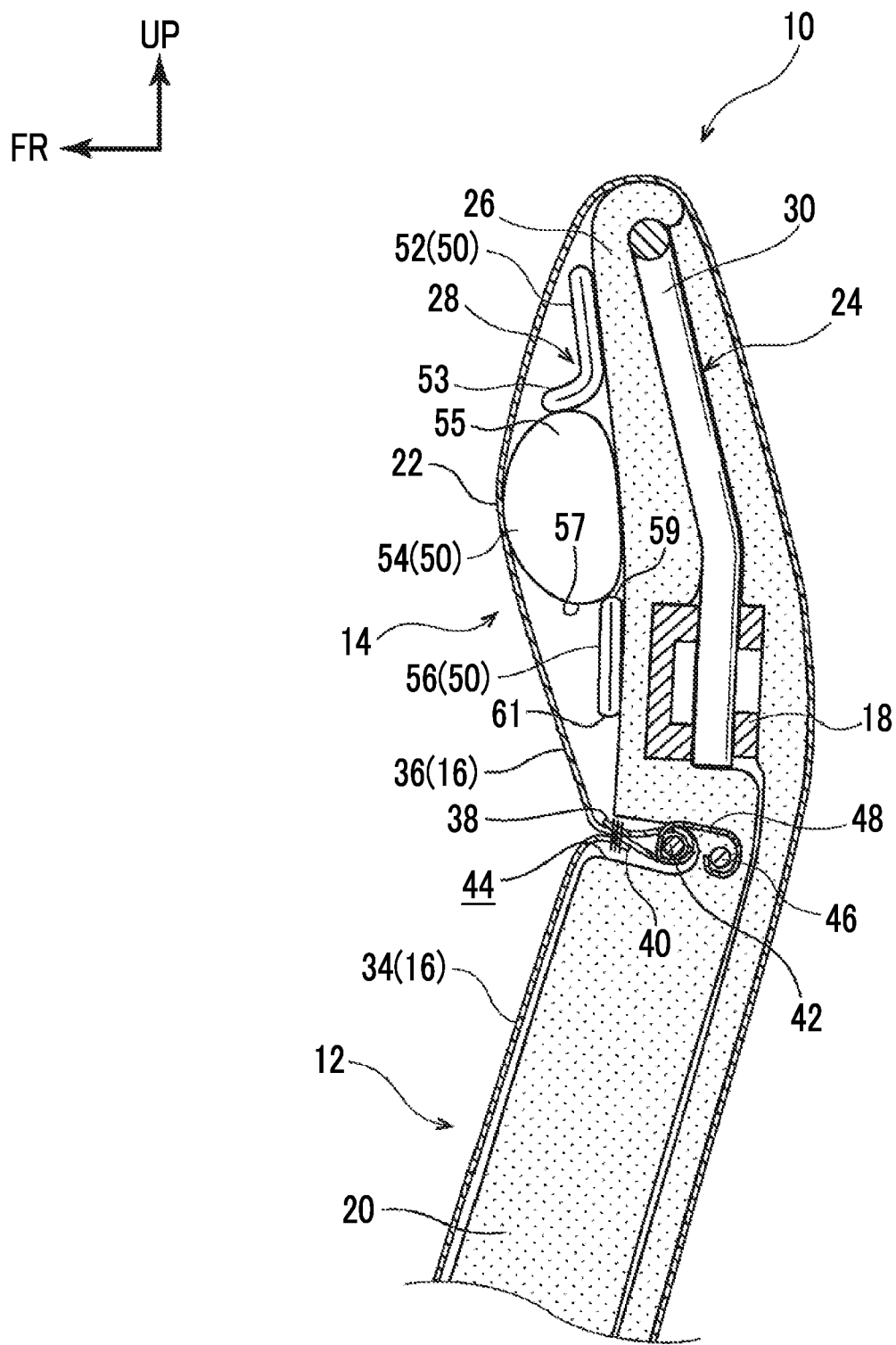
FIG. 3 is a sectional view illustrating a state in which a second airbag operated in the headrest body of the vehicle seat according to the first embodiment is viewed in the vehicle side view.

In a case where an occupant B (not illustrated) having a physique of about a standard body type is seated on the vehicle seat 10, the neck of the occupant B is positioned substantially in the middle of the headrest body 14 in the vehicle up-down direction. In this case, by operating the pump and the controller by operating an operation switch, air is supplied to the second airbag 54 as illustrated in FIG. 3 such that the second airbag 54 swells toward the front side of the vehicle. Therefore, the swelling portion 22 that is a portion of the headrest covering portion 36 (the skin material 16) in the seat-height direction swelling toward the front side of the vehicle is formed substantially in the middle of the headrest body 14 in the vehicle up-down direction. The neck of the occupant B can be supported by the swelling portion 22 formed substantially in the middle of the headrest body 14 in the vehicle up-down direction.

Figure 4:
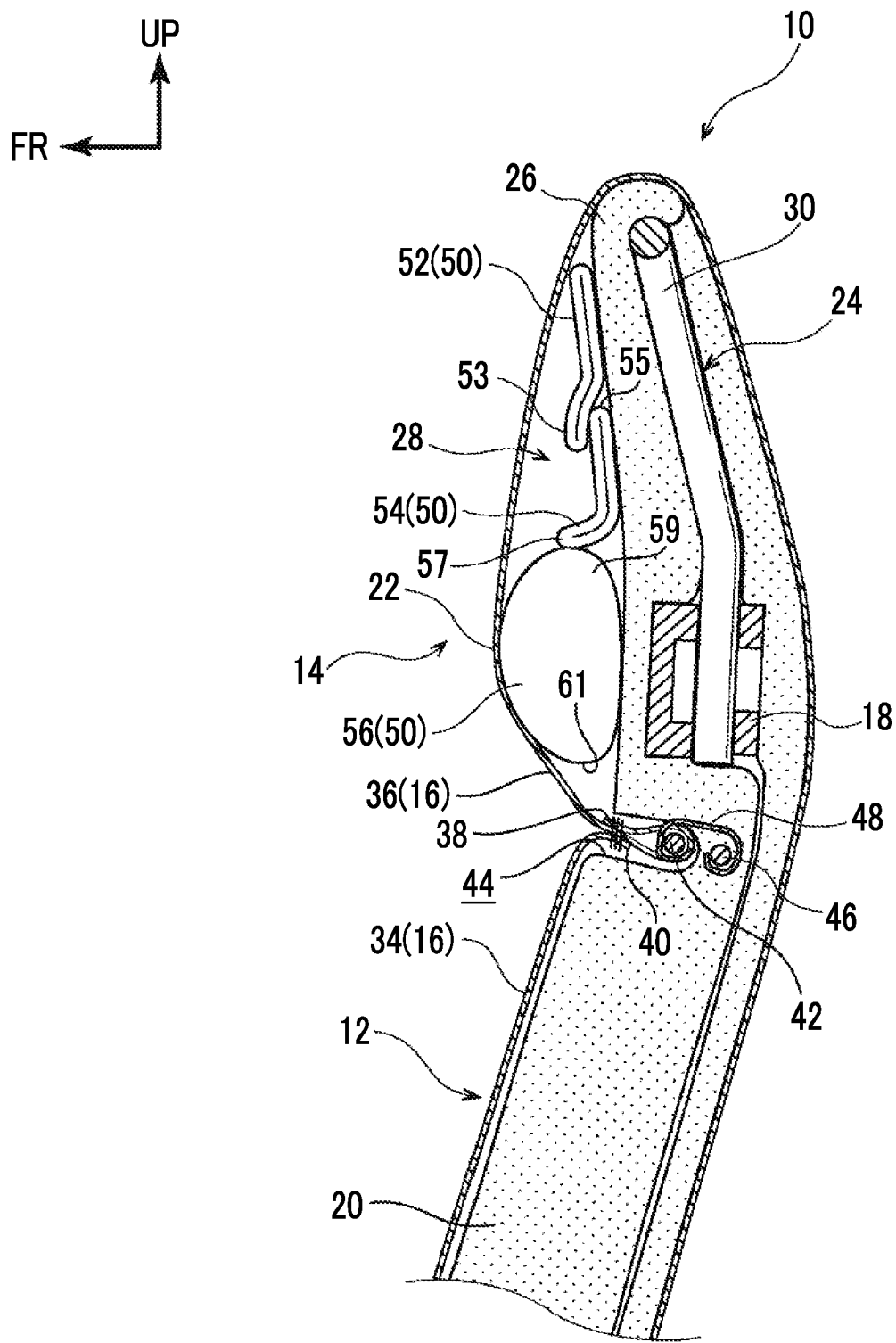
FIG. 4 is a sectional view illustrating a state in which a third airbag operated in the headrest body of the vehicle seat according to the first embodiment is viewed in the vehicle side view.

Furthermore, in a case where an occupant C (not illustrated) having a relatively small physique is seated on the vehicle seat 10, the neck of the occupant C is positioned at a position corresponding to the vehicle lower side of the headrest body 14. In this case, by operating the pump and the controller by operating an operation switch (not illustrated), air is supplied to the third airbag 56 as illustrated in FIG. 4 such that the third airbag 56 swells toward the front side of the vehicle. Therefore, the swelling portion 22 that is a portion of the headrest covering portion 36 (the skin material 16) in the seat-height direction swelling toward the front side of the vehicle is formed at the vehicle lower side of the headrest body 14. The neck of the occupant C can be supported by the swelling portion 22 formed at the vehicle lower side of the headrest body 14.

Figure 5:
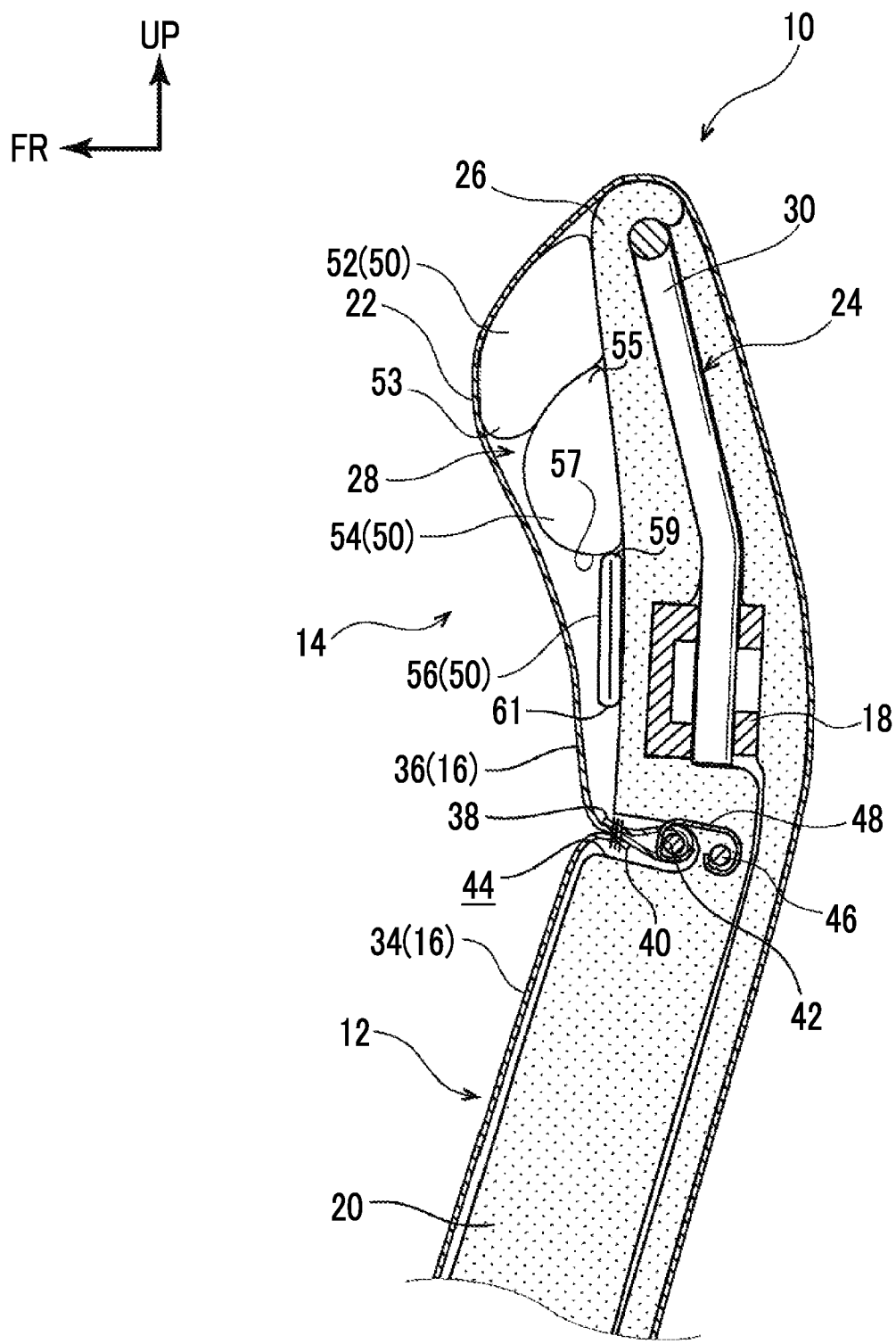
FIG. 5 is a sectional view illustrating a state in which a first airbag and the second airbag operated in the headrest body of the vehicle seat according to the first embodiment are viewed in the vehicle side view.

As described above, since the lower end portion 53 of the first airbag 52 is disposed to overlap the upper end portion 55 of the second airbag 54 in the vehicle front-rear direction, as illustrated in FIG. 5, by supplying air to each of the first airbag 52 and the second airbag 54, the swelling portion 22 in the headrest body 14 is formed at a position corresponding to the overlap between the first airbag 52 and the second airbag 54. In this case, the swelling portion 22 is disposed closer to the lower side of the vehicle than in a case where air is supplied solely to the first airbag 52, and the swelling portion 22 is disposed closer to the upper side of the vehicle than in a case where air is supplied solely to the second airbag 54.

Figure 6:
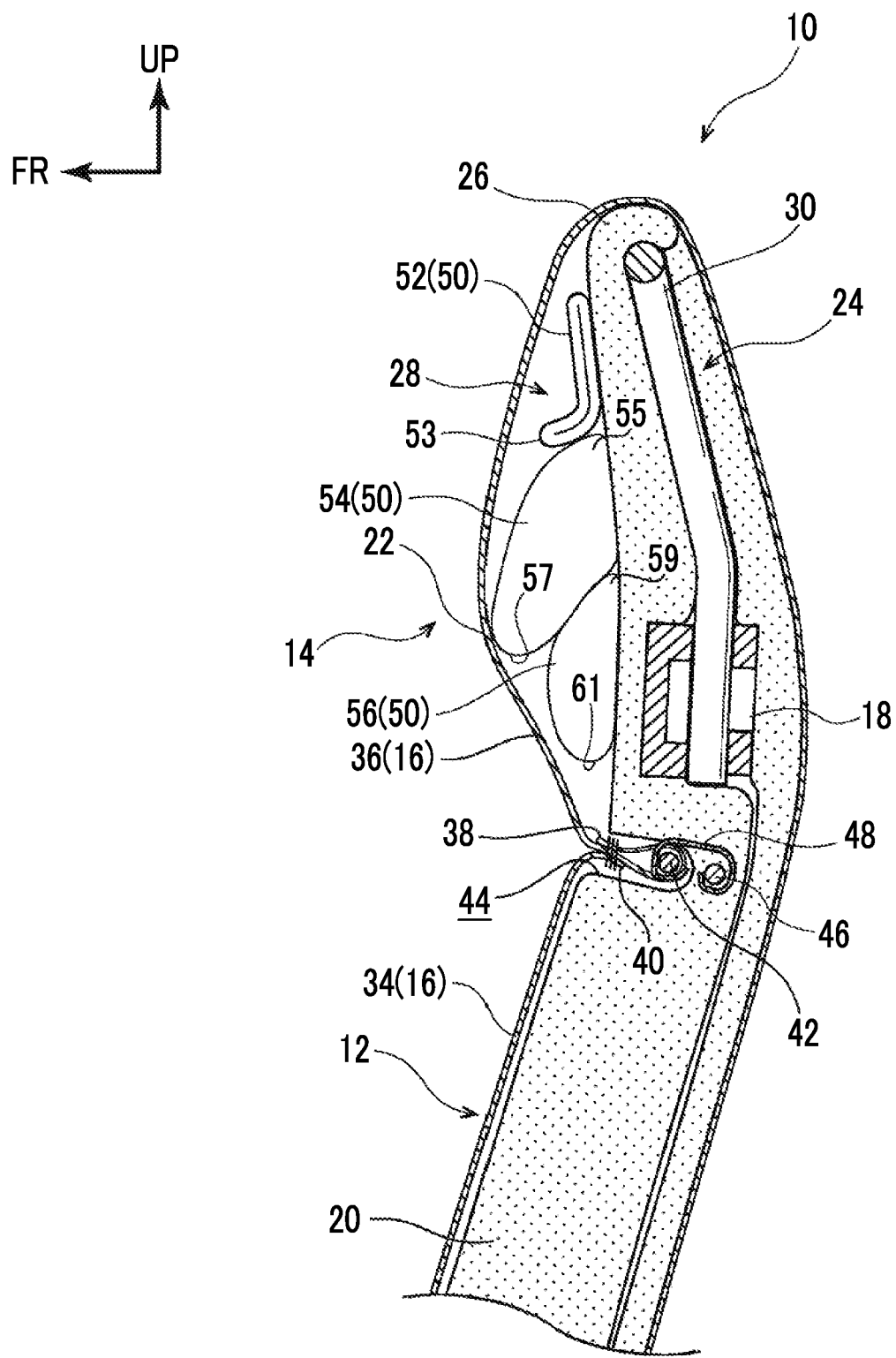
FIG. 6 is a sectional view illustrating a state in which the second airbag and the third airbag operated in the headrest body of the vehicle seat according to the first embodiment are viewed in the vehicle side view.

In addition, since the lower end portion 57 of the second airbag 54 is disposed to overlap the upper end portion 59 of the third airbag 56 in the vehicle front-rear direction, as illustrated in FIG. 6, by supplying air to each of the second airbag 54 and the third airbag 56, the swelling portion 22 in the headrest body 14 is formed at a position corresponding to the overlap between the second airbag 54 and the third airbag 56. In this case, the swelling portion 22 is disposed closer to the lower side of the vehicle than in the case where air is supplied solely to the second airbag 54, and the swelling portion 22 is disposed closer to the upper side of the vehicle than in a case where air is supplied solely to the third airbag 56. Therefore, by controlling the amount of air supplied to each of the first airbag 52, the second airbag 54, and the third airbag 56, the swelling amount of the swelling portion 22 in the vehicle front-rear direction can be controlled, and the position where the swelling portion 22 is formed can be changed in the seat-height direction.

Operations and Effects of First Embodiment

Next, the operations and effects of the first embodiment will be described.

In the first embodiment, as illustrated in FIG. 1, the headrest body 14 covered with the skin material 16 is provided at the upper portion of the seat back 12 rotatably supported by the seat cushion. In the headrest body 14, by operating the airbags 50 in the driving body 28 provided inside the headrest body 14, the swelling portion 22 that is a portion of the skin material 16 in the seat-height direction swelling toward the front side of the vehicle is formed at the surface of the seat front side of the skin material 16. Therefore, the neck of the occupant positioned forward of the headrest body 14 in the vehicle front-rear direction can be supported by the swelling portion 22. In addition, since the swelling portion 22 is configured such that the formation position of the swelling portion 22 is changed in the seat-height direction by controlling the amount of air supplied to each of the first airbag 52, the second airbag 54, and the third airbag 56, the swelling portion 22 can be easily moved according to the position of the neck varying with the occupant. Accordingly, the position of the portion that supports the neck of the occupant can be easily adjusted.

In addition, since the driving body 28 is configured to include the airbags 50 configured to be inflated by air being supplied into the airbags 50, the swelling portion 22 can be formed as long as the airbags 50 and the pumps that supply air to the airbags 50 are provided. In addition, by arranging the first airbag 52, the second airbag 54, and the third airbag 56 of the airbags 50 along the vehicle up-down direction and adjusting the amount of air supplied to each of the airbags 50 using the controllers, the formation position of the swelling portion 22 can be changed in the seat-height direction. That is, in general, in a case of a configuration in which the swelling portion 22 is formed of an actuator, a motor, or the like, another actuator, motor, or the like is needed to change the formation position of the swelling portion 22 in the seat-height direction. However, in the embodiment of the disclosure, by adjusting the amount of air supplied to each of the first airbag 52, the second airbag 54, and the third airbag 56 using the single pump and the controller, the formation position of the swelling portion 22 can be changed in the seat-height direction. Accordingly, the swelling portion 22 can be allowed to swell and move with a relatively small number of components. As a result, space saving can be achieved.

Furthermore, the headrest covering portion 36 of the skin material 16 that covers the headrest body 14 is provided continuously with the seat back front surface covering portion 34 that covers the seat back 12. Therefore, when the swelling portion 22 is formed, the part of the occupant from the neck of the occupant to the shoulder of the occupant supported by the seat back 12 can be continuously supported by the skin material 16. That is, the part of the occupant from the neck to the shoulder can be widely covered. Accordingly, comfort at the time of seating can be improved.

Figure 7B:
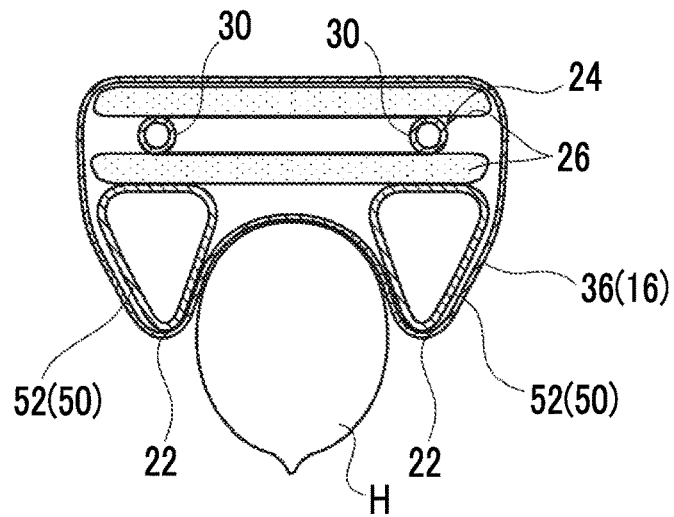
FIG. 7B is a sectional view illustrating a state taken along line VIIB-VIIB in FIG. 7A.

Furthermore, as illustrated in FIG. 7A, the first airbags 52 are divided into right and left airbags between which the vertical line V passes through the middle of the headrest body 14 in the seat-width direction in the vehicle front view, and the right and left portions are respectively disposed at both sides of the headrest body 14 in the seat-width direction. Accordingly, when air is supplied, as illustrated in FIG. 7B, the right and left portions swell toward the front side of the vehicle on the right and left sides of the head H of the occupant. Therefore, the head H of the occupant can be supported from the right and left sides. Accordingly, the property of holding the head of the occupant can be improved.

In addition, the third airbag 56 disposed closer to the lower side of the vehicle is set to have greater dimensions in the seat-width direction in the inflated state than the first airbag 52 and the second airbag 54 disposed closer to the upper side of the vehicle. In general, in the case where the occupant A having a relatively large physique is seated, the shoulder of the occupant A is positioned near the third airbag 56 provided at the vehicle lower side of the headrest body 14. However, in the case of the first embodiment, since the dimensions of the third airbag 56 in the seat-width direction in the inflated state corresponding to the shoulder of the occupant A are set to be greater than the first airbag 52 and the second airbag 54, the shoulder of the occupant A can be widely supported. Accordingly, comfort at the time of seating can be further improved.

In the first embodiment, the airbags 50 are constituted of the first airbags 52, the second airbags 54, and the third airbag 56. However, the airbags 50 are not limited thereto and may also be constituted of two airbags or four or more airbags.

Second Embodiment

Next, a vehicle seat according to a second embodiment will be described with reference to FIG. 8. Like elements basically similar to those of the first embodiment described above are denoted by like reference numerals, and the description thereof will be omitted.

A vehicle seat 62 according to the second embodiment has the same basic configuration as that of the first embodiment and is characterized in that a driving body 64 is operated by driving a motor.

Figure 8:
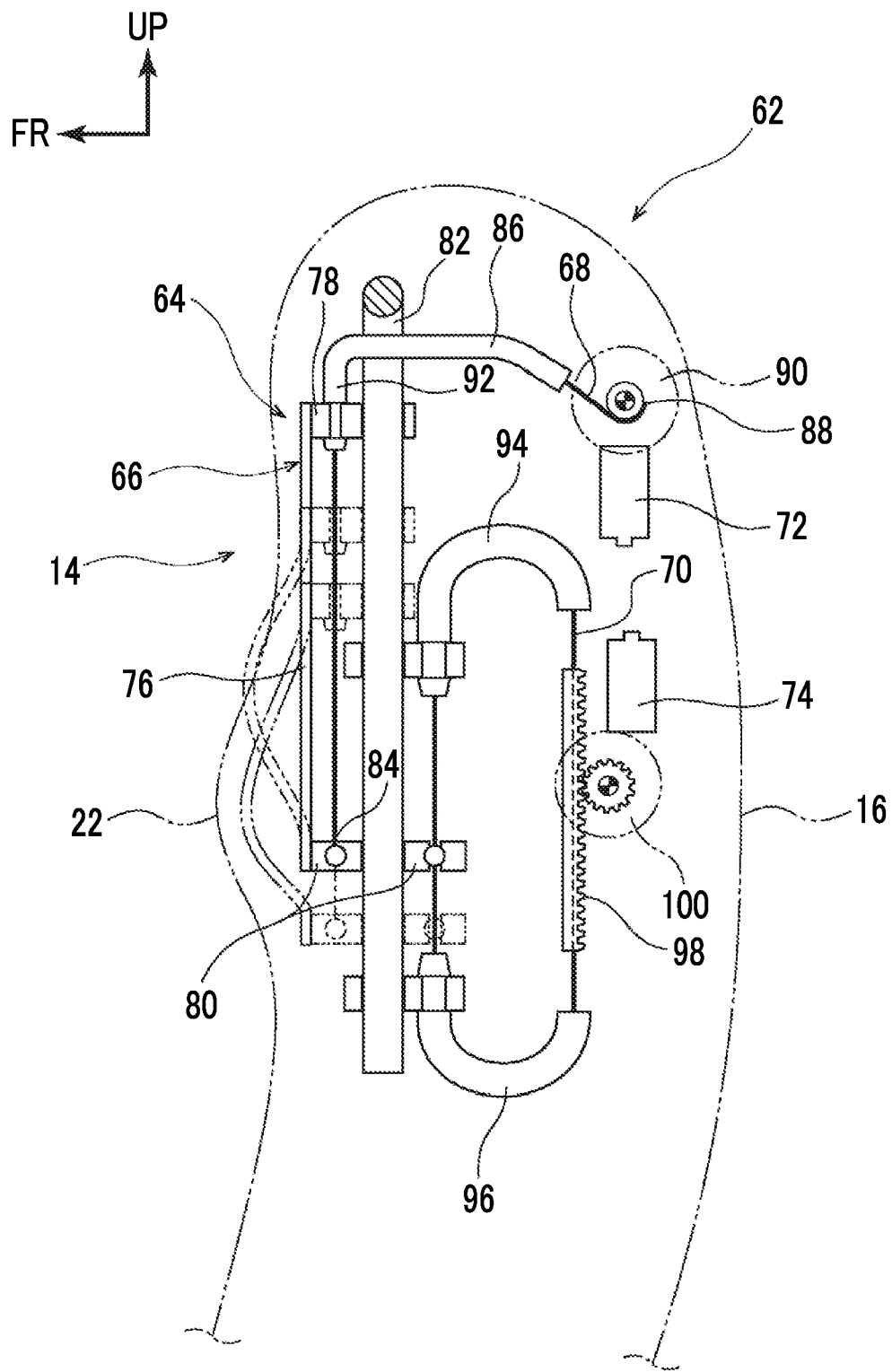
FIG. 8 is a sectional view illustrating a state in which a headrest body of a vehicle seat according to a second embodiment is viewed in a vehicle side view.

That is, as illustrated in FIG. 8, the driving body 64 is provided inside the headrest body 14. The driving body 64 is configured to include an extension and contraction portion 66, a first wire 68, a second wire 70, a front-rear adjusting motor 72, and an up-down adjusting motor 74.

The extension and contraction portion 66 is configured to include a curved plate 76, an upper support portion 78, and a lower support portion 80. The upper support portion 78 and the lower support portion 80 are disposed forward of a headrest stay 82 in the vehicle front-rear direction, the headrest stay 82 extending in the vehicle up-down direction, and is attached to the headrest stay 82 to be movable relative to the headrest stay 82 in the vehicle up-down direction. The curved plate 76 is made of an elastically deformable material and is attached to the vehicle front side surfaces of the upper support portion 78 and the lower support portion 80.

The first wire 68 is inserted into a first holding tube 86, and a first end portion 84 of the first wire 68 is attached to the lower support portion 80 of the extension and contraction portion 66. In addition, a second end portion 88 of the first wire 68 is attached to a winding gear 90. The winding gear 90 is rotated by driving force from the front-rear adjusting motor 72 connected to an operation switch (not illustrated) to wind the first wire 68. A first end portion 92 of the first holding tube 86 is held by the upper support portion 78. Therefore, the first holding tube 86 moves integrally with the upper support portion 78. Furthermore, the winding gear 90 and the front-rear adjusting motor 72 are configured to move integrally with the upper support portion 78 by a holding member (not illustrated).

The second wire 70 is disposed rearward of the headrest stay 82 in the vehicle front-rear direction and is inserted into a second holding tube 94 and a third holding tube 96 attached to the headrest stay 82. Specifically, the second wire 70 has an elliptical ring shape with the vehicle up-down direction as its major axis in a vehicle side view, the vehicle upper side of the second wire 70 is inserted into the second holding tube 94, and the vehicle lower side of the second wire 70 is inserted into the third holding tube 96. In addition, a portion of the vehicle front side of the second wire 70 is fixed to the lower support portion 80. Furthermore, a rack gear 98 is attached to a portion of the vehicle rear side of the second wire 70. The rack gear 98 is made of a member having flexibility, and is configured to mesh with an up-down adjusting gear 100 that is rotated by driving force of the up-down adjusting motor 74 connected to an operation switch (not illustrated) fixed to the inside of the headrest body 14.

Operation of Driving Body

The driving body 64 operates as follows. First, in the case where the occupant A having a relatively large physique is seated on the vehicle seat 62, the neck of the occupant A is positioned at the vehicle upper side of the headrest body 14. In this case, by operating the front-rear adjusting motor 72 by operating the operation switch, the interval between the upper support portion 78 and the lower support portion 80 is reduced, and the curved plate 76 is elastically deformed toward the front side of the vehicle. Accordingly, the swelling portion 22 that is a portion of the headrest covering portion 36 (the skin material 16) swelling toward the front side of the vehicle is formed (see the two-dot chain line in FIG. 8). Along with the formation of the swelling portion 22, the up-down adjusting motor 74 is operated by operating the operation switch to move the lower support portion 80 toward the upper side of the vehicle. Accordingly, the entirety of the extension and contraction portion 66 moves toward the upper side of the vehicle along the headrest stay 82, and the swelling portion 22 can be moved toward the vehicle upper side of the headrest body 14. The neck of the occupant A can be supported by the swelling portion 22 formed at the vehicle upper side of the headrest body 14.

In addition, in the case where the occupant B (not illustrated) having a physique of about a standard body type is seated on the vehicle seat 62, the neck of the occupant B is positioned substantially in the middle of the headrest body 14 in the vehicle up-down direction. In this case, the curved plate 76 is elastically deformed toward the front side of the vehicle by operating the front-rear adjusting motor 72, and the entirety of the extension and contraction portion 66 is moved to substantially the middle of the headrest body 14 in the vehicle up-down direction by operating the up-down adjusting motor 74. Accordingly, the swelling portion 22 is formed at substantially the middle of the headrest body 14 in the vehicle up-down direction. The neck of the occupant B can be supported by the swelling portion 22 formed at substantially the middle of the headrest body 14 in the vehicle up-down direction.

Furthermore, in the case where the occupant C (not illustrated) having a relatively small physique is seated on the vehicle seat 62, the neck of the occupant C is positioned at the position corresponding to the vehicle lower side of the headrest body 14. In this case, the curved plate 76 is elastically deformed toward the front side of the vehicle by operating the front-rear adjusting motor 72, and the entirety of the extension and contraction portion 66 is moved toward the vehicle lower side of the headrest body 14 by operating the up-down adjusting motor 74. Accordingly, the swelling portion 22 is formed at the vehicle lower side of the headrest body 14. The neck of the occupant C can be supported by the swelling portion 22 formed at the vehicle lower side of the headrest body 14. In addition, the swelling amount of the swelling portion 22 swelling toward the front side of the vehicle can be adjusted by adjusting the operation amount of the front-rear adjusting motor 72. In addition, the swelling position of the swelling portion 22 in the vehicle up-down direction can be adjusted by adjusting the operation amount of the up-down adjusting motor 74.

Operations and Effects of Second Embodiment

Next, the operations and effects of the second embodiment will be described.

Since the configuration of the second embodiment is the same as that of the vehicle seat 10 of the first embodiment except that the driving body 64 is operated by driving a motor, the same effects as those of the first embodiment can be obtained.

Furthermore, since the driving body 64 is operated by the front-rear adjusting motor 72 and the up-down adjusting motor 74, moving the swelling position of the swelling portion 22 and adjusting the swelling amount of the swelling portion 22 can be rapidly performed.

In the vehicle seats 10, 62 according to the first and second embodiments described above, the headrest body 14 is formed integrally with the seat back 12. However, the headrest body 14 is not limited thereto and may also be formed separately from the seat back 12.

Furthermore, although the driving bodies 28, 64 are configured to be operated by operating the corresponding operation switches, the driving bodies 28, 64 are not limited thereto. The driving bodies 28, 64 may also be configured to detect the position of the neck of the occupant seated on the vehicle seat 10, 62 using a sensor (not illustrated) and automatically adjust the formation position of the swelling portion 22 based on the detection result.

While the embodiments of the disclosure have been described above, the disclosure is not limited to the embodiments described above, and various modifications other than the embodiments described above can be made within a scope not deviating from the disclosure.

What is claimed is:

1. A vehicle seat comprising:
a headrest body provided at an upper portion of a seat back rotatably supported by a seat cushion on which an occupant is seated, wherein:
the headrest body is covered with a skin material; and
the headrest body includes a driving body that is configured to form a swelling portion that is a portion of the skin material in a seat-height direction swelling toward a front side of the seat at a surface of a seat front side of the skin material and change a formation position of the swelling portion in the seat-height direction by being operated inside the headrest body, the driving body including a plurality of airbags, wherein:
a first airbag is included in the plurality of airbags, the first airbag having a first width in a seat-width direction in an inflated state and being disposed at a first position in the seat-height direction,
a second airbag is included in the plurality of airbags, the second airbag having a second width in the seat-width direction in an inflated state that is equal to the first width and being disposed adjacent to the first airbag and below the first airbag at a second position lower than the first position in the seat-height direction,
a third airbag is included in the plurality of airbags, the third airbag having a third width in the seat-width direction in an inflated state that is greater than the first width and being disposed adjacent to the second airbag and below the second airbag at a third position lower than the second position in the seat-height direction,
a lower end portion of the first air bag and an upper end portion of the second airbag are overlapped with each other in a seat front-rear direction,
a lower end portion of the second airbag and an upper end portion of the third airbag are overlapped with each other in the seat front-rear direction,
each of the first air bag and the second airbag are independently inflatable, and
the driving body is disposed between a headrest cushion and the skin material in the seat front-rear direction.

2. The vehicle seat according to claim 1, wherein the airbags are arranged in the seat-height direction and configured to be inflated by air being supplied into the airbags.

3. The vehicle seat according to claim 2, wherein at least two of the plurality of airbags are respectively disposed at both sides of the headrest body in a seat-width direction.

4. The vehicle seat according to claim 2, wherein the plurality of airbags includes a fourth airbag, the third and fourth airbags being disposed at the same position in the seat-height direction, and the third airbag is disposed at a different position in a seat-width direction than the fourth airbag.

5. The vehicle seat according to claim 1, wherein the skin material of the headrest body is configured to be continuous with the skin material that covers the seat back.

6. The vehicle seat according to claim 1, wherein the driving body includes an up-down adjusting motor configured to adjust a position of the swelling portion in the seat-height direction, and a front-rear adjusting motor configured to adjust a position of the swelling portion in a seat front-rear direction.

7. A vehicle seat comprising:
a headrest body provided at an upper portion of a seat back rotatably supported by a seat cushion on which an occupant is seated, wherein:
the headrest body is covered with a skin material;
the headrest body includes a driving body that is configured to form a swelling portion that is a portion of the skin material in a seat-height direction swelling toward a front side of the seat at a surface of a seat front side of the skin material and change a formation position of the swelling portion in the seat-height direction by being operated inside the headrest body; and
the driving body includes an up-down adjusting motor disposed inside of the headrest body and configured to adjust a position of the swelling portion in the seat-height direction, and a front-rear adjusting motor configured to adjust a position of the swelling portion in a seat front-rear direction, wherein
a shape of the skin material changes in response to a change in the position of the swelling portion in the seat-height direction by the up-down adjusting motor and the position of the swelling portion in the seat front-rear direction by the front-rear adjusting motor.

* * * * *